United States Patent [19]

Banse

[11] Patent Number: 5,108,126

[45] Date of Patent: Apr. 28, 1992

[54] WHEEL SUSPENSION ASSEMBLY

[76] Inventor: Robert J. Banse, 510 Citrus Ave., Imperial Beach, Calif. 92032

[21] Appl. No.: 583,139

[22] Filed: Sep. 17, 1990

[51] Int. Cl.$^5$ .............................................. B60G 3/18
[52] U.S. Cl. ..................................... 280/668; 446/466
[58] Field of Search ............... 280/696, 691, 724, 725, 280/726, 660, 661, 663, 666, 668, 670, 673, 675; 446/466

[56] References Cited

U.S. PATENT DOCUMENTS

| | | | |
|---|---|---|---|
| 2,580,559 | 1/1952 | Kolbe | 208/666 |
| 3,326,544 | 6/1967 | Smith | 208/666 |
| 4,515,390 | 5/1985 | Greenberg | 280/675 |
| 4,854,603 | 8/1989 | Scaduto | 280/675 |
| 4,881,752 | 11/1989 | Tanaka | 280/675 |

FOREIGN PATENT DOCUMENTS

| | | | |
|---|---|---|---|
| 2137757 | 2/1973 | Fed. Rep. of Germany | 280/666 |
| 2441905 | 3/1976 | Fed. Rep. of Germany | 280/670 |
| 438238 | 8/1948 | Italy | 280/670 |

Primary Examiner—Charles A. Marmor
Assistant Examiner—Tamara L. Finlay
Attorney, Agent, or Firm—Henri J. A. Charmasso

[57] ABSTRACT

In an independent wheel suspension assembly using a parallelogrammic linkage between the vehicle infrastructure and the wheel mounting member, a damper or shock absorber is mounted in a substantially horizontal position between an anchor point on the vehicle infrastructure and a levering bracket extending from the upper or lower arm of the parallelogrammic linkage. The horizontal placement of the damper lowers the overall profile of the vehicle and provides a convenient way for adjusting its elevation in relation to the wheels without affecting the damping characteristics of the suspension. The invention is particularly applicable to remotely controlled model racing cars.

12 Claims, 1 Drawing Sheet

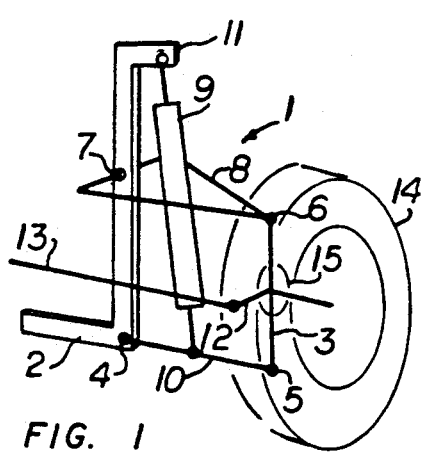

WHEEL SUSPENSION ASSEMBLY

FIELD OF THE INVENTION

This invention relates to automotive vehicle suspension and steering systems, and more particularly to independent wheel suspension assemblies using a parallelogrammic linkage between the vehicle infrastructure and the wheel mounting member.

BACKGROUND OF THE INVENTION

The conventional independent wheel suspension assembly of an automotive vehicle is grammatically illustrated in FIG. 1. A parallelogrammic linkage 1 is used between the infrastructure of the vehicle 2 and the upright wheel mounting member 3. The linkage 1 operates about the four pivoting points 4, 5, 6 and 7. The upper arm 8 of the linkage generally has a triangular or wishbone shape in order for provide clearance for the vertically mounted damper or shock absorber 9 connected between the lower arm 10 and an anchor point 11 in the upper part of the infrastructure 2. In a front wheel assembly, a steering arm 12 extends from the wheel mounting upright member 3 and is pivotally connected to the track rod 13. The wheel 14 mounts on the hub 15 which forms an integral part of the upright member 3 and contains the brake mechanism.

In many sport cars and racing cars where the lowest possible profile is desirable, the damper anchoring point 11 constitutes the highest point of the vehicle infrastructure. A lower profile can only be achieved by reducing the lengths of the damper to its practical limit. The minimum height of the damper attachment becomes a critically limiting parameter. The problem is compounded in self-powered and remotely controlled model racing cars due to the impossibility of making effective dampers commensurate in size with the model vehicle. Accordingly, it is now impossible to maintain a proper scale relationship between the wheel suspension assembly and the overall dimensions of the model vehicle.

SUMMARY OF THE INVENTION

The principal and secondary objects of the instant invention are to provide for a quasi-horizontal placement of the damper in an independent wheel suspension in order to reduce the overall height of the suspension assembly, and to allow for a convenient adjustment of the vehicle infrastructure elevation in relation to the axles of the wheels.

These and other objects are achieved by connecting the damper between a low point in the central part of the vehicle infrastructure and a lever extending from the upper or lower arm of the parallelogrammic linkage assembly.

BRIEF DESCRIPTION OF THE DRAWING

FIG. 1 is a diagrammatical representation of an independent wheel suspension of the prior arts;

FIG. 2 is a diagram illustrating a first embodiment of the invention;

FIG. 3 is a diagram illustrating a second embodiment of the invention;

FIG. 4 is a front elevational view of a model car front wheel assembly according to the invention; and FIG. 5 is a perspective view of a model car parallelogrammic wheel linkage assembly.

DESCRIPTION OF THE PREFERRED EMBODIMENT OF THE INVENTION

FIG. 2 of the drawing illustrates a first embodiment of the invention which is best understood by comparison to the structure of the prior art illustrated in FIG. 1. The wishbone member 8 which forms the upper arm of the parallelogrammic linkage has been replaced by a straight member 16. A damper mounting lever 17 extends from the upper arm 16 in a generally radial and upward direction from the pivot point 7. The damper 9 is connected between the upper end 18 of the lever 17 and one of a plurality of anchor points 19 on a centrally located lower part of the infrastructure 2. Accordingly, the elevation of the highest point of the linkage assembly, in this case the end of the lever 17, is considerably lower than the anchoring point 11 of the prior art. The elevation of the infrastructure 2 in relation to the hub 15 of the wheel can be conveniently adjusted by connecting the opposite end of the damper to one of the anchoring points 19 on the chassis or infrastructure 2.

In the second embodiment of the invention diagrammatically illustrated in FIG. 3, a damper mounting lever 19 extends in a generally upward direction from the pivoting point 4 of the lower arm 20. This configuration further reduces the overall height of the linkage assembly.

FIG. 4 offers a more comprehensive illustration of a suspension assembly particularly applicable to model racing cars. It should be noted that relatively long shock absorbers or dampers 22 and 23 are used. These dampers span almost the entire width of the vehicle without any detrimental effect on the overall height of the assembly. The multiple anchoring points 24 and 25 along the mounting plate 21 secured to the infrastructure 2 of the vehicle by anchor members 26 allows for a convenient adjustment of the height of the vehicle in relationship to the wheels 27 and 28. The angle 29 between the radial orientation of the damper lever 30 and the orientation of the upper arm 31 may vary between 70 and 110 degrees with optimum performance around 95 degrees.

FIG. 5 illustrates a wheel suspension linkage assembly particularly adapted to replace the conventional assembly used on many model racing cars. Anchor member 26 is specifically shaped and dimensioned to be attached directly to the model car infrastructure 2 and to support the mounting plate 21. The paritally depicted upright wheel mounting member 33 is the same as the one used on many contemporary models. The lower arm 34 is relatively similar to the conventional lower arm except that it does not require any connecting point for the damper. The upper arm 35 has been greatly simplified, and comprises the damper lever 36. The lever 36 is pivotally mounted on the uppermost part of the damper-mounting plate 21 which lies in substantially the same vertical plane as the lower and upper arm of the parallelogrammic linkage. The first radial arm 37 is pivotally connected to one end of the damper, and the second radial arm 38 engages a threaded rod 39 which forms the central part of the upper arm 35. The pivoting connector 40 to the upright member 33 engages the opposite end of the threaded rod 39, the adjustable length of the upper arm 35 provides a convenient way for correcting the camber of the wheel.

While the preferred embodiments of the invention have been described, modifications can be made and other embodiments can be devised without departing from the spirit of the invention and the scope of the appended claims.

What is claimed is:

1. In an independent wheel suspension comprising a parallelogrammatic linkage between the wheel and the infrastructure of a vehicle, said linkage comprising a wheel-mounting member, a lower arm pivotally connected to a lower part of an upright member and to a low point of the infrastructure, a upper arm pivotally connected to a upper part of the upright member and to a high point of said infrastructure above and space-apart from said low point, and a damper connected between one of said arms and a point of said infrastructure; the improvement which comprises:
   a damper-connecting lever attached to one of said arms and extending in a substantially radial direction from one of said points; and
   means for mounting said damper in a substantially horizontal position between said damper-connecting lever and one of a plurality of anchor points on said infrastructure;
   wherein said anchor points are located at an elevation not higher than said high points; and
   wherein said damper-connecting lever is attached to the linkage upper arm.

2. The improvement of claim 1 which further comprises:
   an anchor member fixedly attached to said lower point of the infrastructure, and pivotally supporting said lower arm;
   a damper-mounting plate fixedly attached to said anchor member, and substantially lying in the same vertical plane as said parallelogrammic linkage;
   said damper-connecting lever being pivotally mounted at said high point on said damper-mounting plate, and having a first radial arm pivotally attached to one end of the damper, and a second radial arm fixedly and axially connected to said upper arm.

3. The improvement of claim 2, wherein the first radial arm extends in a substantially vertical position from said high point.

4. The improvement of claim 3, wherein an angle between said first and second radial arms is within the range of 70 to 110 degrees.

5. The improvement of claim 4, wherein said plurality of anchor points are located on said damper-mounting plate.

6. The improvement of claim 5, wherein the upper arm comprises a length-adjustable component.

7. In an independent wheel suspension of a reduced-scale model car comprising a parallelogrammatic linkage between the wheel and the infrastructure of the car, said linkage comprising a wheel-mounting member, a lower arm pivotally connected to a lower part of an upright member and to a low point of the infrastructure, a upper arm pivotally connected to a upper part of the upright member and to a high point of said infrastructure above and spaced-apart from said low point, and a damper connected between one of said arms and a point of said infrastructure; the improvement which comprises:
   a damper-connecting lever attached to one of said arms and extending in a substantially radial direction from one of said points;
   means for mounting said damper in a substantially horizontal position between said damper-connecting lever and one of a plurality of anchor points on said infrastructure;
   wherein said anchor points are located at an elevation not higher than said high point; and
   said damper-connecting lever is attached to the linkage upper arm.

8. The improvement of claim 7 which further comprises:
   an anchor member fixedly attached to said low point of the infrastructure, and pivotally supporting said lower arm;
   a damper-mounting plate fixedly attached to said anchor member, and substantially lying in the same vertical plane as said parallelogrammic linkage;
   said damper-connecting lever being pivotally mounted at said high point on said damper-mounting plate, and having a first radial arm pivotally attached to one end of the damper, and a second radial arm fixedly and axially connected to said upper arm.

9. The improvement of claim 8, wherein the first radial arm extends in a substantially vertical position from said high point.

10. The improvement of claim 9, wherein an angle between said first and second radial arms is within the range of 70 to 110 degrees.

11. The improvement of claim 10, wherein said plurality of anchor points are located on said damper-mounting plate.

12. The improvement of claim 11, wherein the upper arm comprises a length-adjustable component.

* * * * *